United States Patent
Itou et al.

(10) Patent No.: US 7,275,688 B2
(45) Date of Patent: Oct. 2, 2007

(54) PRICE INFORMATION PRESENTATION SYSTEM, PRICE INFORMATION PRESENTATION CONTROL DEVICE, PRICE INFORMATION PRESENTATION METHOD, AND COMPUTER-READABLE STORAGE MEDIUM RECORDING PRICE INFORMATION PRESENTATION CONTROL PROGRAM THEREON

(75) Inventors: Hiroki Itou, Maebashi (JP); Hajime Horikawa, Maebashi (JP)

(73) Assignee: Fujitsu Limited, Kawasaki (JP)

(*) Notice: Subject to any disclaimer, the term of this patent is extended or adjusted under 35 U.S.C. 154(b) by 268 days.

(21) Appl. No.: 11/037,219

(22) Filed: Jan. 19, 2005

(65) Prior Publication Data

US 2005/0121515 A1    Jun. 9, 2005

Related U.S. Application Data

(63) Continuation of application No. PCT/JP02/13306, filed on Dec. 19, 2002.

(51) Int. Cl.
    *G06K 15/00* (2006.01)
(52) U.S. Cl. .................. 235/383; 235/378; 235/385; 705/37
(58) Field of Classification Search .............. 235/383, 235/378; 705/26, 37
    See application file for complete search history.

(56) References Cited

U.S. PATENT DOCUMENTS 6,076,070 A * 6/2000 Stack .................. 705/20
6,873,968 B2 * 3/2005 Ehrlich et al. ............ 705/26
2003/0074267 A1 * 4/2003 Acharya et al. .......... 705/26

FOREIGN PATENT DOCUMENTS

| JP | 10-63725 | | 3/1998 |
| JP | 10-63749 | | 3/1998 |
| JP | 1063749 | * | 3/1998 |
| JP | 2001-126147 | | 5/2001 |
| JP | 2001126147 | * | 5/2001 |
| JP | 2001-319138 | | 11/2001 |
| JP | 2001-325532 | | 11/2001 |
| JP | 2001-344444 | | 12/2001 |
| JP | 2002-108879 | | 4/2002 |
| JP | 2002-117155 | | 4/2002 |
| JP | 2002-288793 | | 10/2002 |
| JP | 2003-44709 | | 2/2003 |

* cited by examiner

*Primary Examiner*—Steven S. Paik
(74) *Attorney, Agent, or Firm*—Kratz, Quintos & Hanson, LLP

(57) ABSTRACT

A price information presentation system that easily notifies a shopping customer that his/her buying price is lower than one when buying at another store to improve the satisfaction level of the customer. The system includes a price database of other stores, a buying information input section, an obtaining section of another store's price information that refers to the price database of other stores and obtains the selling price of the same article at another store as the article that the customer bought, a price difference calculating section that calculates a price difference between the selling prices of the article that the customer bought and the selling price at another store, and presentation sections that present the price difference calculated by the price difference calculating section to the customer.

20 Claims, 8 Drawing Sheets

FIG. 2

| BARCODE | ARTICLE NAME | REGULAR PRICE | STARTING DATE OF SPECIAL SALE | ENDING DATE OF SPECIAL SALE | SPECIAL SALE PRICE |
|---|---|---|---|---|---|
| 4901234567890 | BATTERY | 980 | 2002/08/01 | 2002/08/31 | 780 |
| 4909876543210 | BULB | 1280 | 2002/08/10 | 2002/08/20 | 980 |
| 49666666 | MOUSE | 1500 | | | |
| ... | ... | ... | ... | ... | ... |

↙ 21

| STORE NUMBER | STORE NAME | BARCODE | ARTICLE NAME | REGULAR PRICE | STARTING DATE OF SPECIAL SALE | ENDING DATE OF SPECIAL SALE | SPECIAL SALE PRICE |
|---|---|---|---|---|---|---|---|
| 002 | STORE B | 4901234567890 | BATTERY × 4 | 1280 | 2002/08/05 | 2002/08/20 | 1080 |
| 002 | STORE B | 4909876543210 | BATTERY × 2 | 1380 | | | |
| 002 | STORE B | 49666666 | MOUSE | 1500 | | | |

| STORE NUMBER | STORE NAME | BARCODE | ARTICLE NAME | REGULAR PRICE | STARTING DATE OF SPECIAL SALE | ENDING DATE OF SPECIAL SALE | SPECIAL SALE PRICE |
|---|---|---|---|---|---|---|---|
| 001 | STORE A | 4901234567890 | BATTERY PACK | 960 | | | |
| 001 | STORE A | 4909876543210 | BULB PACK | 1500 | 2002/08/10 | 2002/08/20 | 1060 |
| 001 | STORE A | 49666666 | MOUSE | 1500 | | | |
| ... | ... | ... | ... | ... | ... | ... | ... |
| 002 | STORE B | 4901234567890 | BATTERY × 4 | 1280 | 2002/08/05 | 2002/08/20 | 1080 |
| 002 | STORE B | 4909876543210 | BULB × 2 | 1380 | | | |
| 002 | STORE B | 49666666 | MOUSE | 1500 | | | |
| ... | ... | ... | ... | ... | ... | ... | ... |
| 003 | STORE C | 4909876543210 | BULB | 1200 | 2002/08/10 | 2002/08/20 | 1000 |
| 003 | STORE C | 49666666 | MOUSE | 1500 | | | |
| ... | ... | ... | ... | ... | ... | ... | ... |

50

```
BATTERY        ¥780
    YOU SAVED 300YEN COMPARING TO SHOPPING AT STORE B.
SUB-TOTAL      ¥1760
```

```
TOTAL          ¥1760
    YOU SAVED 700YEN COMPARING TO SHOPPING AT STORE B.
```

FIG. 8

○○○STORE
XXXBRANCH

WE ARE OPEN EVERYDAY THIS MONTH.
※※※※※※※※※※※※
AUGUST 15, 2002 (THU) 12:30

※※※※※※※※※※※※
YOU SAVED 700YEN BY SHOPPING AT OUR STORE.

※※※※※※※※※※※※

010 BATTERY                  ¥780
　　　YOU SAVED 300YEN COMPARING TO
　　　SHOPPING AT STORE B.
020 BULB                     ¥980
　　　YOU SAVED 400YEN COMPARING TO
　　　SHOPPING AT STORE B.
                  :

PRICE INFORMATION PRESENTATION SYSTEM, PRICE INFORMATION PRESENTATION CONTROL DEVICE, PRICE INFORMATION PRESENTATION METHOD, AND COMPUTER-READABLE STORAGE MEDIUM RECORDING PRICE INFORMATION PRESENTATION CONTROL PROGRAM THEREON

This application is a continuation of international application PCT/JP02/13306 filed Dec. 19. 2002.

BACKGROUND OF THE INVENTION

1. Field of the Invention

The present invention relates to a price information presentation system, a price information presentation control device, a price information presentation method, and a computer-readable storage medium recording a price information presentation control program thereon, by which price information regarding an article that a customer bought from a dealer is presented for the customer.

2. Description of the Related Art

Consumers, when buying an article sold at a plurality of dealers, have a desire to buy the article from a store (dealer) selling it at a lowest price out of the plurality of stores. For example, Japanese Patent Laid-open No. 2002-108879 discloses a method in which product sales information (names of stores, number of stocks, prices, etc.) among a plurality of stores are managed at once and the product sales information of the plurality of stores selling the product are obtained when a user searches it by using the name of product as a key. By using such a method, the user compares and weighs the stores having stock of the product that he/she wants to buy, and can decide on a store to buy the product without visiting the plurality of stores.

However, in addition to previously obtaining selling prices of an article at a plurality of stores as described above, there is a desire, after buying the article, to compare the buying price with a selling price of another store. Specifically, even in the case where a customer shopped without checking the selling prices at the plurality of stores, his/her satisfaction level improves if he/she knew that the buying price was lower than a buying price at another store. Further, customers also have a desire to easily know how much he/she could gain (save) by buying the article at the store compared to buying it from another store. Then, by satisfying such desire of the customers, the store can improve the satisfaction level of the customers.

After the customer did his/her shopping, he/she can check the selling price of the article at another store by using the method disclosed in the above-described Japanese Patent Laid-open No.2002-108879, but there is a problem that the checking of selling prices is bothersome.

The present invention has been created in consideration of such a problem, and it is an object of the present invention to provide the price information presentation system, the price information presentation control device, the price information presentation method, the price information presentation control program, and the computer-readable storage medium recording the program, which are capable of improving the satisfaction level of customers by easily notifying a customer who shopped an article that its buying price is lower than a buying price at another store.

SUMMARY OF THE INVENTION

To achieve the above-described object, the price information presentation system of the present invention is a price information presentation system that presents price information regarding an article that a customer bought from a dealer for the customer, and the system may comprise a price database of other stores in which selling prices of articles of at least one of other dealers other than the dealer are recorded previously; a buying information input section capable of inputting information regarding the buying of an article by the customer; an obtaining section of another store's price information, which obtains the selling price at another dealer regarding the same article as the article that the customer bought while referring to the price database of other stores based on the information input to the buying information input section; a price difference calculating section that calculates a price difference between the selling price of the article that the customer bought and the selling price at another dealer obtained by the obtaining section of another store's price information; and presentation sections that present the price difference calculated by the price difference calculating section for the customer.

Further, when the customer buys a plurality of articles, the price difference calculating section may calculate the price difference for each of the plurality of articles, or may calculate the price difference for the sum amount of the selling prices of the plurality of articles.

Furthermore, the presentation section may be constituted as a printing device capable of printing information regarding the price difference on a receipt paper, or may be constituted as a display device capable of displaying the information regarding the price difference.

Still further, the price information presentation control device of the present invention is a price information presentation control device that presents price information regarding an article that a customer bought from the dealer for a customer, and the device may comprise, an obtaining section of another store's price information, which obtains the selling price at another dealer regarding the same article as the article that the customer bought while referring to a price database of other stores in which selling prices of articles of at least one of other dealers other than the dealer are recorded previously based on the information regarding the buying of the article by the customer, the price difference calculating section that calculates a price difference between the selling price of the article that the customer bought and the selling price at another dealer obtained by the obtaining section of another store's price information, and a presentation control section that controls presentation sections to present the price difference calculated by the price difference calculating section for the customer.

Note that when the customer buys a plurality of articles, the price difference calculating section may calculate the price difference for each of the plurality of articles, or may calculate the price difference for the sum amount of the selling prices of the plurality of articles.

Furthermore, the presentation section may be constituted as the printing device capable of printing information regarding the price difference on a receipt paper, or may be constituted as a display device capable of displaying the information regarding the price difference.

Still further, the price information presentation method of the present invention is a price information presentation method that presents price information regarding an article that a customer bought from a dealer for the customer, which comprises the steps of inputting buying information, where information regarding the buying of an article by the customer is input, obtaining another store's price information, where the selling price at another dealer regarding the same article as the article that the customer bought while referring to the price database of other stores, in which the selling prices of articles of at least one of other dealers other than the dealer are recorded previously, based on the information input on the step of inputting buying information; calculating a price difference, where a price difference between the selling price of the article that the customer bought and the selling price at another dealer obtained by the step of obtaining information of another store's prices; and presenting the price difference calculated by the step of calculating price difference for the customer.

Note that when the customer buys a plurality of articles, the price difference may be calculated for each of the plurality of articles in the step of calculating a price difference, or the price difference may be calculated for the sum amount of the selling prices of the plurality of articles.

Further, in the step of presenting the price difference, information regarding the price difference may be printed on a receipt paper, or information regarding the price difference may be displayed on a display device.

Further, a computer-readable storage medium of the present invention records a price information presentation control program for presenting price information regarding an article that a customer bought from a dealer for the customer, the program causing a computer to function as an obtaining section of another store's price information, which obtains the selling price at another dealer regarding the same article as the article that the customer bought while referring to a price database of other stores in which selling prices of articles of at least one of other dealers other than the dealer are recorded previously based on the information regarding the buying of the article by the customer, a price difference calculating section that calculates a price difference between the selling price of the article that the customer bought and the selling price at another dealer obtained by the obtaining section of another store's price information; and a presentation control section that controls the presentation sections to present the price difference calculated by the price difference calculating section for the customer.

Note that when the customer buys a plurality of articles, the program may allow the price difference calculating section to calculate the price difference for each of the plurality of articles, or to calculate the price difference for the sum amount of the selling prices of the plurality of articles.

Furthermore, the presentation section may be constituted as a printing device capable of printing information regarding the price difference on a receipt paper, or may be constituted as a display device capable of displaying information regarding the price difference.

As described, according to the price information presentation system, the price information presentation control device, the price information presentation method, and the computer-readable storage medium recording the price information presentation control program of the present invention, the following effects and advantages are exerted.

(1) By presenting a price difference in which the price difference between the selling price of an article that the customer bought and the selling price at another dealer has been calculated, a customer can easily know the price difference from the selling price at another dealer, the satisfaction level of the customer can be improved by improving the convenience for the customer, by which the satisfaction level of the customer is improved and loyalty hooks to the customer can be done (effect of loyalty hooks). Particularly, when the buying price of the article is lower than the buying price at another dealer, the satisfaction level of the customer can be further improved.

(2) When the customer buys a plurality of articles, the customer can know more detailed price information by calculating the price difference for each of the plurality of articles, by which the satisfaction level of the customer can be improved as well.

(3) When the customer buys a plurality of articles, the customer can know more detailed price information about the total amount by calculating the price difference for the sum amount of the plurality of articles, and it is easy to know how much he/she gained in the sum amount, for example. This can also improve the satisfaction level of the customer.

(4) By printing information regarding the price difference on a receipt paper or displaying it on a display device, it is possible to present the information about the price difference easily and inexpensively for the customer.

BRIEF DESCRIPTION OF THE DRAWINGS

FIG. 2 is a view showing an example of a price database of a dealer's own store in the price information presentation system as an embodiment of the present invention.

FIG. 4 is a view showing an example of a price database of local stores in the price information presentation system as an embodiment of the present invention.

FIG. 8 is a view showing a print example of a receipt paper output from the POS terminal in the price information presentation system as an embodiment of the present invention.

DETAILED DESCRIPTION OF EXEMPLARY EMBODIMENTS

Embodiments of the present invention will be described with reference to the drawings as follows.

Figure 1:
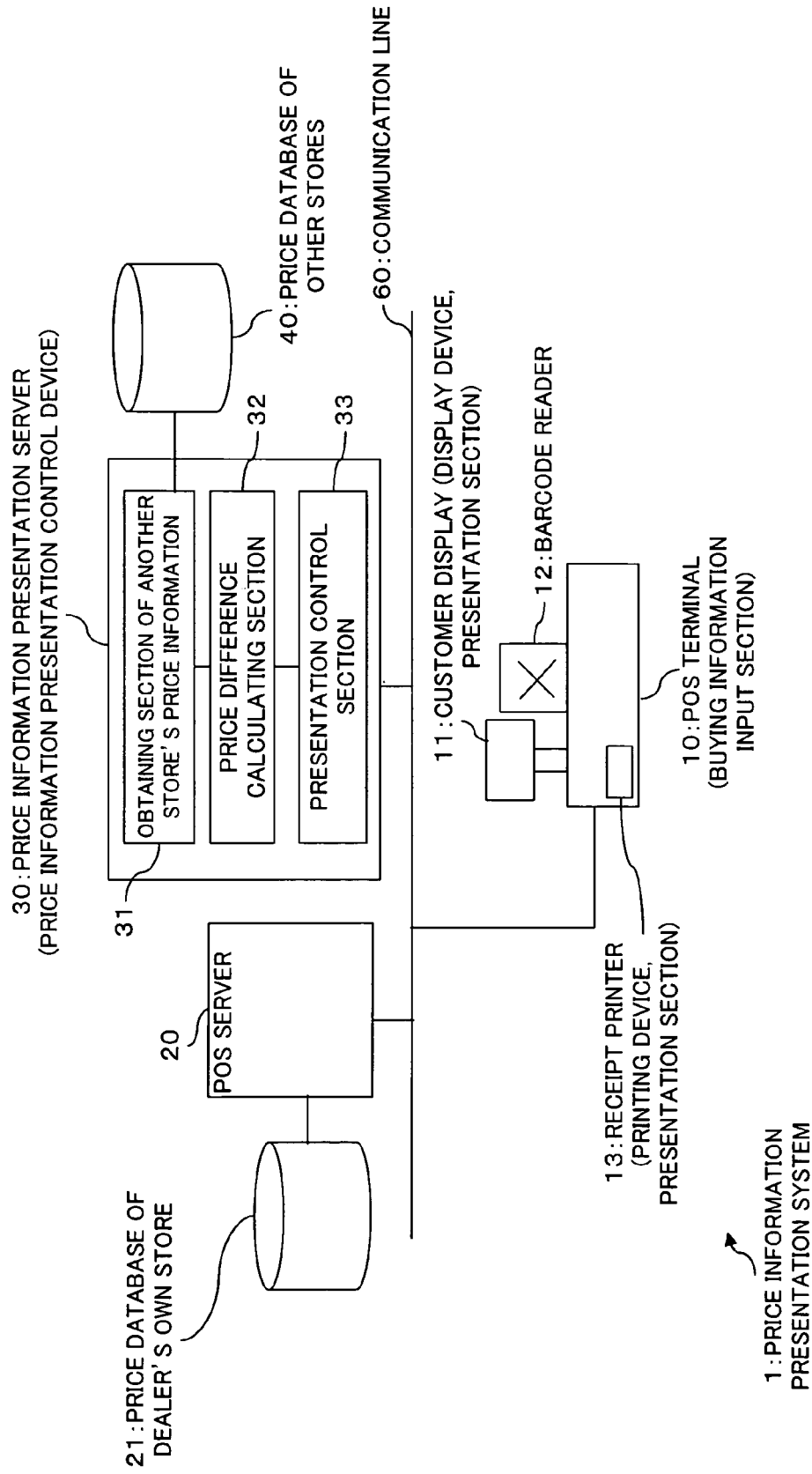
FIG. 1 is a view schematically showing a constitution of a price information presentation system as an embodiment of the present invention.

FIG. 1 is a view schematically showing a constitution of a price information presentation system 1 as an embodiment of the present invention. The price information presentation system 1 of the present invention, as shown in FIG. 1, comprises a POS terminal (buying information input section) 10, a POS server 20, a price information presentation server (price information presentation control device) 30, a price database of other stores 40, price database of dealer's own store 21, and a communication line 60.

The POS terminal (Point Of Sales) terminal 10 is installed to a cash register in a store (dealer: not shown), and is for inputting the content of business transaction (shopping) conducted between the store and a customer. Specifically, the POS terminal 10 is constituted by including a barcode reader 12, and it reads a barcode attached to an article to notify the POS server 20 of data such as an article code at the point where the article has been sold (at the point where the sales has been recorded in the cash register).

Meanwhile, although only one POS terminal 10 is provided in FIG. 1, the invention is not limited to this and two or more POS terminals 10 may be provided. Hereinafter, a description will be made in this embodiment by using one POS terminal 10 for the sake of simplicity.

Further, the POS terminal 10 is constituted by comprising a customer display (display device, presentation section) 11 and a receipt printer (printing device, presentation section) 13, as shown in FIG. 1. The customer display 11 displays information regarding transaction content or a price difference (described in detail later)for the customer, and the receipt printer 13 prints information regarding the transaction content or the price difference (described in detail later)on a receipt paper. In other words, the POS terminal 10, by including the customer display 11 and the receipt printer 13, also functions as a presentation section for presenting the price difference (described in detail later) for the customer.

The POS server 20 is communicably connected to the POS terminal 10 via the communication line 60, obtains the information such as the barcode (article code) transmitted from the POS terminal 10, and is capable of aggregating and analyzing a sales number of articles and fast-moving articles in real time.

The price database of dealer's own store 21 is a database that records information such as selling prices of articles in a store equipped with the POS terminal 10 (hereinafter, also called as dealer's own store), and is constituted while information for identifying articles (article code and article name, for example) is associated with the information such as selling prices. Note that the POS terminal 10 obtains the selling prices recorded in the price database of dealer's own store 21 to calculate an amount of money or the like.

FIG. 2 is a view showing an example of the price database of dealer's own store 21 in the price information presentation system 1 as an embodiment of the present invention. The price database of dealer's own store 21 shown in FIG. 2 relates to electric appliances, and is constituted while barcodes (article codes), article names, regular prices, starting date of special sale, ending date of special sale, and special sale prices are associated with each other and registered.

Note that, in the example shown in FIG. 2, the barcodes show the content of barcodes attached to articles in integers, by which the articles can be identified. Specifically, in the present embodiment, the barcodes function as information regarding the buying of articles by a customer. Further, in this price information presentation system 1, common barcodes are used among a plurality of stores, and the same article is identified by a particular barcode in each store (store A, store B, etc.).

The special sale prices are prices applied only during a special sale period. The starting date of special sale is a starting date of the special sale period, that is, the starting date when the special sale prices are applied, and the ending date of special sale is an ending date of the special sale period, that is, the final date when the special prices are applied. The regular prices are selling prices on days (regular) other than the special sale period. Specifically, the special sale prices are applied as the selling prices of articles during the special sale period, and the regular prices are applied as the selling prices during a period other than the special sale period.

The price database of other stores 40 is a database that records the selling prices of articles in other stores, and is constituted while the information for identifying articles (article codes and article names, for example) is associated with the selling prices or the like, similar to the price database of dealer's own store 21.

Figure 3:
FIG. 3 is a view showing an example of a price database of other stores in the price information presentation system as an embodiment of the present invention.

FIG. 3 is a view showing an example of the price database of other stores 40 in the price information presentation system 1 as an embodiment of the present invention. Note that the price database of other stores 40 shown in FIG. 3 is constituted by previously recording the selling prices of articles at store B. The price database of other stores 40 shown in FIG. 3 also relates to electric appliances similar to the price database of dealer's own store 21 shown in FIG. 2, and is constituted by registering the store numbers, the store names, the barcodes (article codes), the article names, the regular prices, the starting date of special sale, the ending date of special sale, and the special sale prices while associating them with each other. The store numbers are numbers that are previously set to each store, and the store name is the name of each store. Further, since the same items in the drawing as the items already described denote the same or approximately the same items, their explanation will be omitted.

The price database of other stores 40 is constituted by selecting the selling prices of particular stores, the selling prices about particular articles or the like from a price database of local stores 50 in FIG. 4.

FIG. 4 is a view showing an example of the price database of local stores 50 in the price information presentation system 1 as an embodiment of the present invention. The price database of other stores 50 shown in FIG. 4 is constituted by previously recording the selling prices of each article at store A, store B and store C. Further, the price database of local stores 50 shown in FIG. 4 also relates to electric appliances similar to the price database of other stores 40 shown in FIG. 3, and is constituted by registering the store numbers, the store names, the barcodes (article codes), the article names, the regular prices, the starting date of special sale, the ending date of special sale, and the special sale prices while associating them with each other.

Figure 5:
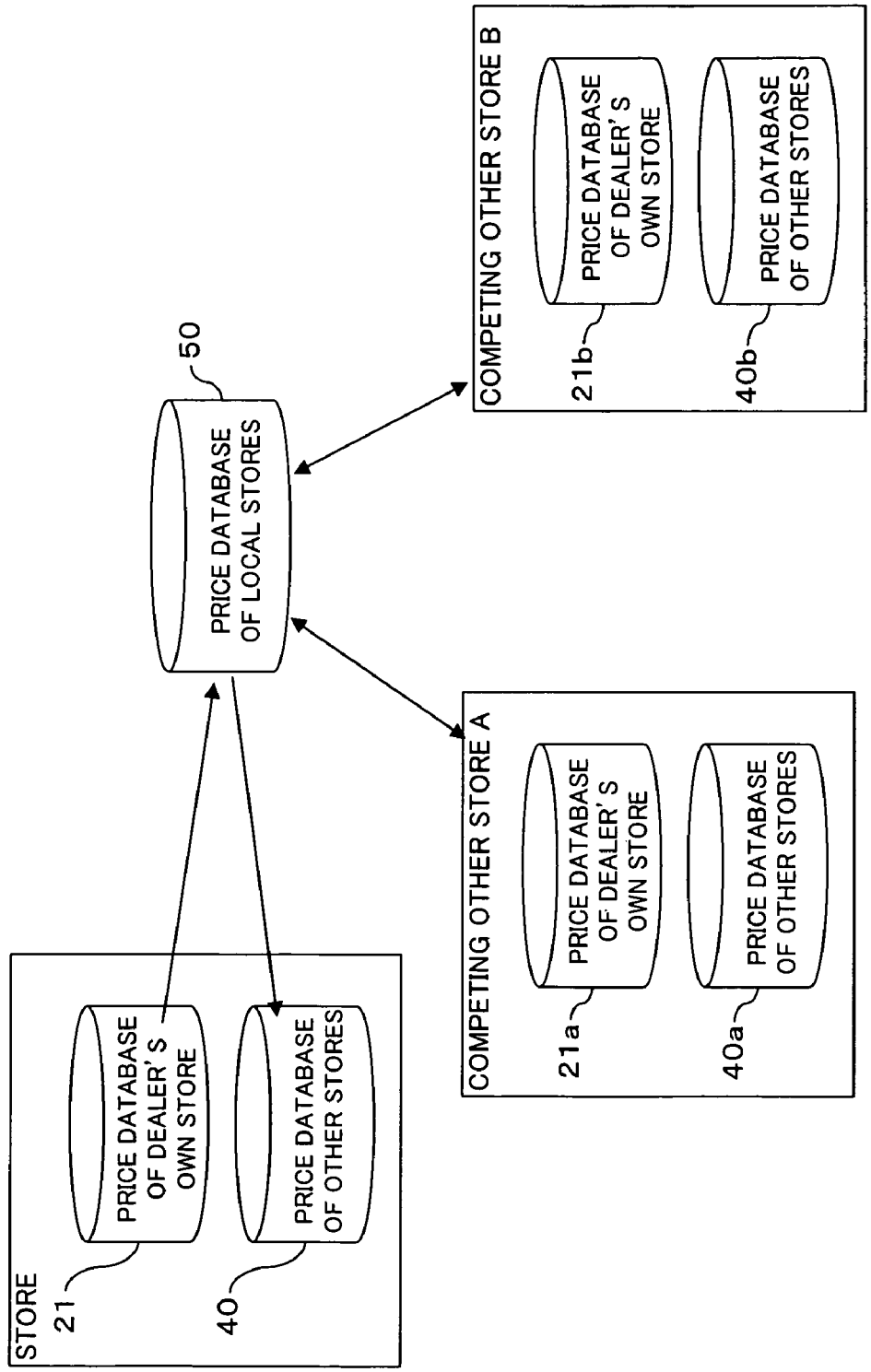
FIG. 5 is a view schematically showing the relationship among the price database of dealer's own store, the price database of other stores, and the price database of local stores in the price information presentation system as an embodiment of the present invention.

FIG. 5 is a view schematically showing the relationship among the price database of dealer's own store 21, the price database of other stores 40, and the price database of local stores 50 in the price information presentation system 1 as an embodiment of the present invention.

The price database of local stores 50 is constituted by integrating the databases (price databases of dealer's own store 21) regarding the selling prices of articles, which a plurality of stores (dealers) severally have and control, as shown in FIG. 5. In FIG. 5, reference numeral 21*a* is attached to the price database of dealer's own store (store A) that another competing store A has and controls, and reference numeral 40*a* is attached to its price database of other stores. Similarly, reference numeral 21*b* is attached to the price database of dealer's own store (store B) that another competing store B has and controls, and reference numeral 40*b* is attached to its price database of other stores.

Then, by transmitting the information (the barcodes, the article names, the regular prices, the starting date of special sale, the ending date of special sale, and the special sale prices in this embodiment) regarding the prices of articles in each store, which is registered with each price database of dealer's own store 21, 21*a*, 21*b*, to the price database of local stores 50, each store can share the information regarding the selling prices.

Then, each store can obtain the information regarding the selling prices of articles at any other stores from the price database of local stores 50. Specifically, each store selectively obtains the information regarding the selling prices of a store (rival store) with which the selling prices are to be compared, and creates the price database of other stores 40, 40*a*, 40*b* respectively.

Note that the store with which the selling prices are to be compared desirably be a geographically closest store, a statistically selected store, a store that a customer wants to compare, or the like, for example. Further, the number of stores with which the selling prices should be compared is not limited to one, but the selling prices may be compared with a plurality of stores. Furthermore, stores with which the selling prices are to be compared may be set for each customer. In this embodiment, only one particular store (store B) is set as a rival store, and a description will be made for the case of comparing with its selling prices.

As a setting method of rival stores, it is possible to set rival stores for each customer based on the aggregation result of questionnaire (questions such as "At which store do you shop most frequently?") to which the customers answered and input through a website on the Internet or medium such as paper, for example.

The price information presentation server (price information presentation control device) 30 presents the price information regarding an article that a customer bought from a store (dealer) for the customer, which is communicably connected to the POS terminal 10, the POS server 20, and the price database of dealer's own store 21 via the communication line 60.

The price information presentation server 30 is constituted by comprising an obtaining section of another store's price information 31, a price difference calculating section 32, and a presentation control section 33. The obtaining section of another store's price information 31 refers to the price database of other stores 40 based on the barcode of an article that the customer bought which is input from the POS terminal 10 (information regarding the buying of the article by the customer), and obtains the selling price of the same article at another store as the article that the customer bought.

The price difference calculating section 32 calculates the price difference between the selling price of the article that the customer bought and the selling price at another store, which has been obtained by the obtaining section of another store's price information 31. Specifically, the price difference calculating section 32 refers to the price database of dealer's own store 21 based on the barcode of an article which has been input from the POS terminal 10 to obtain the selling price of the article, and obtains the selling price of the article at another store from the obtaining section of another store's price information 31 to calculate the price difference between the prices.

Furthermore, when the customer bought a plurality of articles, the price difference calculating section 32 calculates the price difference regarding the sum amount of the selling prices of the plurality of articles in addition to calculating the price difference regarding each of the plurality of articles.

With regard to articles whose selling prices are not registered with the price database of other stores 40, the price difference calculating section 32 calculates the price difference regarding only articles whose selling prices are registered. When the customer bought a plurality of articles, the price difference calculating section 32 calculates the sum amount of the price differences only about the articles whose selling prices are registered.

Further, when the customer bought a plurality of articles and the sum amount of the price differences is calculated, the price difference calculating section 32 does not use the price difference of the selling price of an article from another store if the selling price of another store is lower than the selling price at dealer's own store. In other words, the price difference calculating section 32 calculates the sum amount of price differences only for articles whose selling prices are lower than the selling prices of other stores.

The presentation control section 33 presents the price difference calculated by the price difference calculating section 32 for the customer, and controls the POS terminal 10 to display the price difference on the customer display 11 for customers, which is installed to the POS terminal 10 (refer to FIGS. 6 and 7), or to print it on the receipt paper on which the transaction content is printed (refer to FIG. 8).

Figure 6:
FIG. 6 is a view showing a display example of a customer display of a POS terminal in the price information presentation system as an embodiment of the present invention.
Figure 7:
FIG. 7 is a view showing a display example of a customer display of the POS terminal in the price information presentation system as an embodiment of the present invention.

FIGS. 6 and 7 are views showing display examples on the customer display 11 of the POS terminal 10 in the price information presentation system 1 as an embodiment of the present invention, where FIG. 6 is a view showing an example of displaying the price difference for each article, and FIG. 7 is a view showing an example of displaying the price difference of the sum amount when buying a plurality of articles.

The presentation control section 33, as shown in FIGS. 6 and 7, controls the POS terminal 10 to allow the customer display 11 of the POS terminal 10 to display the price difference calculated by the price difference calculating section 32. In the example shown in FIG. 6, at least three lines of information are displayed on the customer display 11, where the article name and the price of an article bought are displayed on the first line, the price difference from the selling price at another store (store B) is displayed on the second line, and the sub-total is displayed on the third line.

Furthermore, the example shown in FIG. 7 is an example of a screen displayed on the customer display 11 at the end of transaction at the POS terminal 10, that is, when a "POS sub-total key (not shown)" is pressed at the POS terminal 10. At this point, at least two lines of information are displayed on the customer display 11, where the total amount (the sum amount) of articles bought is displayed on the first line, and the price difference from the selling prices at another store (store B) is displayed in the sum amount on the second line.

Note that when the display 11 of the POS terminal 10 is large enough and can display a large amount of information at once, both of FIG. 6 and FIG. 7, that is, the price difference is displayed for each article and the price difference may be displayed in the sum amount simultaneously.

FIG. 8 is a view showing a print example of the receipt paper output from the POS terminal 10 in the price information presentation system 1 as an embodiment of the present invention. As shown in FIG. 8, the presentation control section 33 controls the POS terminal 10 (receipt printer 13) to allow it to print the price difference, which has been calculated by the price difference calculating section 32, on a receipt paper to be passed to the customer.

As shown in FIG. 8, in this embodiment, when the customer bought a plurality of articles, the presentation control section 33 displays the price difference of each article and also prints the sum amount of the price differences on the receipt paper.

Note that either one of the price difference for each article and the price difference of the sum amount may be printed on the receipt paper, by which a consumption amount of receipt paper and ink or the like used in printing on the receipt paper can be reduced.

Further, regarding articles whose selling prices are higher than the selling prices at another store as a result of calculation by the price difference calculating section 32, the presentation control section 33 does not display the price difference on the customer display 11 or the receipt but displays the price difference only for articles whose selling prices at the dealer's own store are lower than the selling prices at another store. Similarly, when the customer bought a plurality of articles, the control section displays the sum amount of selling prices only for articles whose selling prices at the dealer's own store are lower than the selling prices at another store.

Then, the price information presentation server 30 is realized by a computer (information processing device) provided with a server function, and a CPU (Central Processing Unit) of the information processing device that constitutes such a price information presentation server 30 executes a program stored in a computer-readable storage medium (a memory, a magnetic storage device, a flexible disc, a memory card, a magneto-optical storage device, a CD-ROM, a CD-R, a CD-RW, a DVD, a DVD-R, a DVD-RW, etc., for example), and thus they function as the obtaining section of another store's price information 31, the price difference calculating section 32, and the presentation control section 33.

Note that the program (price information presentation control program) for realizing the function as the obtaining section of another store's price information 31, the price difference calculating section 32, and the presentation control section 33 is provided in a mode recorded in the computer-readable storage medium such as a flexible disc, a CD-ROM, a CD-R, a CD-RW, a DVD, a DVD-R, a DVD-RW, a magnetic disc, an optical disc, and a magneto-optical disc. Then, the computer reads out the program from the storage medium to transfer and store it to/in an internal storage device or an external storage device, and use it. Alternatively, the program is recorded in a storage device (storage medium) such as the magnetic disc, the optical disc, and the magneto-optical in advance, and may be provided to the computer from the storage device via a communication path.

In realizing the function as the obtaining section of another store's price information 31, the price difference calculating section 32, and the presentation control section 33, the program stored in the internal storage device (RAM or ROM of a printer in this embodiment) is executed by a microprocessor (CPU of the printer in this embodiment) of the computer. At this point, the computer may read out the program recorded in the storage medium to execute it.

Note that the computer in this embodiment is a concept including hardware and an operating system, and means the hardware that operates under the control of the operating system. Further, when the operating system is not necessary and an application program independently operates the hardware, the hardware itself is equivalent to a computer. The hardware includes at least the microprocessor such as the CPU and a means for reading out computer programs recorded in the storage medium, and the price information presentation server 30 has a function as the computer in this embodiment.

Furthermore, as the storage medium in this embodiment, an IC card, a ROM cartridge, a magnetic tape, a punch card, an internal storage device (memory such as RAM and ROM), an external storage device, or various computer-readable media such as a printed matter on which codes like the barcode are printed can be used in addition to the above-described flexible disc, the CD-ROM, the CD-R, the CD-RW, the DVD, the DVD-R, the DVD-RW, the magnetic disc, the optical disc, and the magneto-optical disc.

The communication line 60 communicably connects the POS terminal 10, the POS server 20, and the price information presentation server 30 with each other, and is constituted by a LAN (Local Area Network) or the like.

Figure 9:
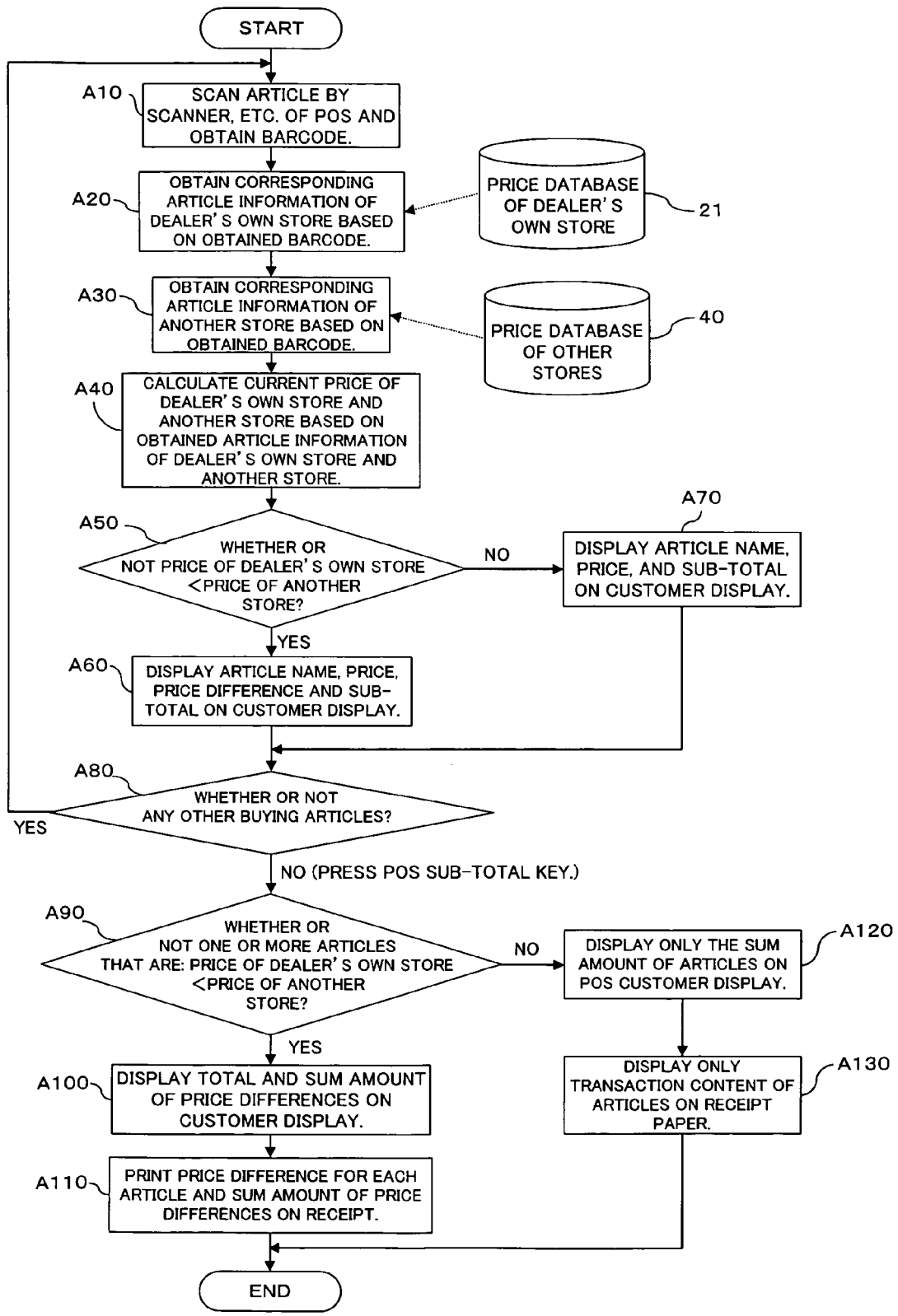
FIG. 9 is a flowchart for explaining a presentation method of price information in the price information presentation system as an embodiment of the present invention.

A presentation method of price information in the price information presentation system 1 as an embodiment of the present invention, which is constituted as described above, will be described according to the flowchart (steps A10 to A130) shown in FIG. 9.

When a customer holds an article that he/she will buy in a store, goes to a cash register in which the POS terminal 10 is installed and tell that he/she wants to buy it, a salesclerk (not shown) scans and reads out a barcode attached to the article by using a scanner 12, a touch scanner (not shown) or the like installed to the POS terminal 10 (step A10: buying information input step). Transaction information such as the information of the readout barcode and the number is transmitted to the POS server 20 and the price information presentation server 30 via the communication line 60.

The price information presentation server 30 obtains information of the article such as the article name, the selling price and the special sale period from the price database of dealer's own store 21 via the POS server 20 as article information (step A20). Further, the obtaining section of another store's price information 31 refers to the price database of other stores 40 based on the barcode, and obtains information such as the selling price and the special sale period as the article information at another store (step A30: obtaining step of another store's price information).

The price difference calculating section 32 calculates a current price (selling price) of the dealer's own store and a current price (selling price) of another store based on the article information of the dealer's own store and another store (step A40), which has been obtained on step A20 and step A30, and calculates the price difference between them (price difference calculation step).

Then, the selling price at dealer's own store and the selling price at another store are compared (step A50) and when the selling price at another store is higher than the selling price at dealer's own store (refer to YES route of step A50), the presentation control section 33 allows the customer display 11 of the POS terminal 10 to display the article name, the selling price, the price difference from the selling price at another store of the article, and the sub-total, as shown in FIG. 6 (step A60: presentation step).

Further, when the selling price at another store is lower than the selling price at dealer's own store (refer to NO route of step A50), the presentation control section 33 allows the customer display 11 of the POS terminal 10 to display only the article name, the selling price of the article and the sub-total (step A70).

Then, the price information presentation server 30 determines whether or not the customer has any other buying articles (step A80). Specifically, the price information presentation server 30 determines whether or not a "POS sub-total key" has been pressed at the POS terminal 10, and repeats steps A10 to A80 until the "POS sub-total key" will be pressed (refer to YES route of step A80).

When the "POS sub-total key" is pressed (refer to NO (press POS sub-total key) route of step A80), the presentation control section 33 then determines whether or not there were one or more articles whose selling prices at another store were higher than the selling prices of dealer's own store (step A90). When there is at least one article whose selling price is lower than the selling price at another store (refer to YES route of step A90), the presentation control section 33 allows the customer display 11 of the POS terminal 10 to display the sum amount of the price differences from another store along with the total amount, as shown in FIG. 7 (step A100).

Then, when an operator of the POS terminal 10 presses a "POS total key (not shown)", the presentation control section 33 allows the POS terminal 10 to print the price differences from the selling price at another store (only ones whose selling prices at dealer's own store are lower than the selling prices at another store) or the sum amount of the price differences (only the sum amount for articles whose selling prices of the dealer's own store are lower than the selling prices of another store) along with the content of transaction (article name, selling price, total, etc.) on the receipt paper (step A110: presentation step) to end processing, as shown in FIG. 8.

Further, when there is no article whose selling price is lower than the selling price at another store (refer to NO route of step A90), the presentation control section 33 allows the customer display 11 of the POS terminal 10 to display only the total amount but does not allow the customer display 11 to display the sum amount of price differences (step A120).

Then, when the operator of the POS terminal 10 presses the "POS total key (not shown)", the presentation control section 33 allows the POS terminal 10 to print only the transaction content (article name, selling price, total, etc.) on the receipt paper and does not allow it to print the price differences and the sum amount of price differences on the receipt paper (step A130: presentation step) to end processing.

As described, according to the price information presentation system 1 as an embodiment of the present invention, the price differences from the selling prices at another store regarding articles that a customer bought are displayed and printed on the customer display 11 and the receipt paper, so that the customer can easily know the price difference from the selling price at another store, where the satisfaction level of the customer can be improved by improving the customer's convenience. This improves the satisfaction level of the customer and loyalty hooks to the customer can be done (effect of loyalty hooks).

Particularly, when the buying price of the article is lower than the buying price at another store, the satisfaction level of the customer can be further improved.

Further, when the customer bought a plurality of articles, the customer can know more detail price information by displaying a price difference for each of the plurality articles, by which the level of satisfaction of the customer can be improved as well.

Furthermore, when the customer bought a plurality of articles, the customer can easily know how much he/she saved in the sum amount because the price difference for the sum amount of selling prices of the plurality of articles is calculated. This can also improve the satisfaction level of the customer.

Additionally, regarding articles whose selling prices at dealer's own store are higher than the selling prices at another store, information (price difference) about the price difference is not displayed on the customer display 11 nor is it printed on the receipt paper, so that even if the selling price at the store is higher than another store, it does not actively appear on surface and there is no need for the store to present the fact to the customer that its selling price is not lower than another store.

Moreover, when the selling prices of dealer's own store are lower than the selling prices at another store, the price differences and their sum amount are displayed on the customer display 11 of the POS terminal 10. Therefore, by allowing other customers in line at the cash register to see the customer display 11, information of articles that are more inexpensive than another store can be informed to the other customers, and thus obtaining advertising effect.

Still further, by previously setting a store (rival store) with which the selling prices are compared and presenting the price difference from the selling prices of the rival store to the customer, buying inclination of the customer at the dealer's own store can be promoted rather than at the rival store.

Then, the present invention is not limited to the above-described embodiments, and it can be implemented in various modifications without departing from the gist of the present invention.

For example, in the above-described embodiments, the price difference calculating section 32 refers to the price database of dealer's own store 21 based on the barcode input from the POS terminal 10 and obtains the selling price of an article bought, but the invention is not limited to this and the section may obtain the selling price of an article input from the POS terminal 10. This makes it possible to reflect an actual selling price such as a case where the store made further discount from an amount registered with the price database of dealer's own store 21.

Further, in the above-described embodiments, when the customer bought a plurality of articles, the price difference calculating section 32 calculates the price difference for each of the plurality of articles and also calculates the price difference for the sum amount of selling prices of the plurality of articles, but the invention is not limited to this. The section may calculate either price difference out of the price difference for each of the plurality of articles and the price difference for the sum amount of selling prices of the plurality of articles.

Furthermore, in the above-described embodiments, the description has been made for the case where only one particular store (store B) was set as a store (rival store) with which the selling prices were compared, but the invention is not limited to this. A plurality of stores may be set as rival stores and comparison may be done with the selling prices of the stores.

In this case, it is desirable to select the selling price at a store that sets the highest selling price from the plurality of rival stores for each article and to calculate the price difference of the selling prices. Accordingly, since a plurality of stores could exist in one transaction (receipt) and the price difference becomes larger, this gives an impression to customers that the store is the one which sells articles at the lowest prices amongst the plurality of stores.

Further, the display examples of the customer display 11 shown in FIGS. 5 and 6 and the printing example of the receipt paper shown in FIG. 7 only show the price difference from another store, but the invention is not limited to this. For example, other information such as the selling price at another store may be displayed and printed, and it can be implemented in various modifications without departing from the gist of the present invention.

Furthermore, the presentation method of the price difference of selling prices for customers is not limited to displaying on the customer display 11 and printing on the receipt as described. For example, the price difference may be sent to e-mail addresses of customers in an e-mail, or may be notified via voice from a speaker. Alternatively, it may be shown on the surface of a point card or the like in a re-writable manner, and the presentation can be implemented in various modifications without departing from the gist of the present invention.

In addition, the price database of local stores 50 may be information of a Web site for comparing selling prices, which is provided on the Internet, for example. Further, the price information presentation system 1 may be applied for a virtual store provided on the Internet.

Still further, in the above-described embodiments, the price differences or their sum amount of articles whose selling prices at a rival store are lower (articles in which the rival store is advantageous in price competition) are not presented for customers, but the invention is not limited to this. The price differences or their sum amount regarding articles whose selling prices at the rival store are lower or articles whose selling prices are the same as the rival store may be presented for the customers.

Note that when each embodiment of the present invention is disclosed, it can be manufactured by those who are skilled in the art.

INDUSTRIAL APPLICABILITY

As described, the price information presentation system, the price information presentation control device, the price information presentation method, the price information presentation control program, and the computer-readable storage medium recording the program of the present invention are useful in providing services for customers, and are particularly suitable for presenting price information regarding articles, which a customer bought from a dealer, for the customer.

What is claimed is:

1. A price information presentation system that presents price information for the customer regarding an article that a customer bought from a dealer, said system comprising:
   a price database of other stores in which selling prices of articles of at least one of other dealers other than the dealer are recorded previously;
   a buying information input section capable of inputting information regarding the buying of an article by the customer;
   an obtaining section of another store's price information, which obtains the selling price at another dealer regarding the same article as the article that said customer bought while referring to the price database of other stores based on said information input to the buying information input section;
   a price difference calculating section that calculates a price difference between the selling price of the article that the customer bought and the selling price at said another dealer obtained by the obtaining section of another store's price information; and
   presentation sections that present the price difference calculated by the price difference calculating section for the customer.

2. The price information presentation system according to claim 1, wherein
   when the customer bought a plurality of articles, the price difference calculating section calculates the price difference for each of said plurality of articles.

3. The price information presentation system according to claim 1, wherein
   when the customer bought a plurality of articles, the price difference calculating section calculates the price difference for the sum amount of the selling prices of said plurality of articles.

4. The price information presentation system according to claim 1, wherein
   the presentation section is a printing device capable of printing information regarding the price difference on a receipt paper.

5. The price information presentation system according to claim 1, wherein
   the presentation section is a display device capable of displaying the information regarding the price difference.

6. A price information presentation control device that presents price information regarding an article that a customer bought from a dealer for the customer, said device comprising:
   an obtaining section of another store's price information, which obtains the selling price at another dealer regarding the same article as the article that said customer bought while referring to a price database of other stores in which selling prices of articles of at least one of other dealers other than the dealer are recorded previously based on the information regarding the buying of the article by the customer;
   a price difference calculating section that calculates a price difference between the selling price of the article that the customer bought and the selling price at said another dealer obtained by the obtaining section of another store's price information; and
   a presentation control section that controls presentation sections to present the price difference calculated by the price difference calculating section for the customer.

7. The price information presentation control device according to claim 6, wherein
   when the customer bought a plurality of articles, the price difference calculating section calculates the price difference for each of said plurality of articles.

8. The price information presentation control device according to claim 6, wherein
   when the customer bought a plurality of articles, the price difference calculating section calculates the price difference for the sum amount of the selling prices of said plurality of articles.

9. The price information presentation control device according to claim 6, wherein
   the presentation section is a printing device capable of printing information regarding the price difference on a receipt paper.

10. The price information presentation control device according to claim 6, wherein
    the presentation section is a display device capable of displaying the information regarding the price difference.

11. A price information presentation method that presents price information regarding an article that a customer bought from a dealer for the customer, comprising the steps of:
    inputting buying information, where information regarding the buying of an article by the customer is input;
    obtaining another store's price information, where the selling price at said another dealer regarding the same article as the article that said customer bought while referring to the price database of other stores, in which the selling prices of articles of at least one of other dealers other than the dealer are recorded previously, based on said information input on the step of inputting buying information;
    calculating a price difference, where a price difference between the selling price of the article that the customer bought and the selling price at said another dealer obtained by the step of obtaining information of another store's price; and presenting the price difference calculated in the step of calculating price difference for the customer.

12. The price information presentation method according to claim 11, wherein when the customer bought a plurality of articles, the price difference is calculated for each of said plurality of articles in the step of calculating a price difference.

13. The price information presentation method according to claim 11, wherein when the customer bought a plurality of articles, the price difference is calculated for the sum amount of said selling prices of the plurality of articles in the step of calculating a price difference.

14. The price information presentation method according to claim 11, wherein information regarding the price difference is printed on a receipt paper in the step of presenting a price difference.

15. The price information presentation method according to claim 11, wherein information regarding the price difference is displayed on a display device in the step of presenting a price difference.

16. A computer-readable storage medium having a price information presentation control program recorded therein for presenting price information regarding an article that a customer bought from a dealer for the customer, wherein the price information presentation control program causing a computer to function as:

an obtaining section of another store's price information, which obtains the selling price at another dealer regarding the same article as the article that said customer bought while referring to a price database of other stores in which selling prices of articles of at least one of other dealers other than the dealer are recorded previously based on the information regarding the buying of the article by the customer;

a price difference calculating section that calculates a price difference between the selling price of the article that the customer bought and the selling price at said another dealer obtained by the obtaining section of another store's price information; and a presentation control section that controls the presentation sections to present the price difference calculated by the price difference calculating section for the customer.

17. The computer-readable storage medium having the price information presentation control program recorded therein according to claim 16, wherein when the customer bought a plurality of articles, the price difference calculating section is allowed to calculate the price difference for each of said plurality of articles.

18. The computer-readable storage medium having the price information presentation control program recorded therein according to claim 16, wherein when the customer bought a plurality of articles, the price difference calculating section is allowed to calculate the price difference for the sum amount of said plurality of articles.

19. The computer-readable storage medium having the price information presentation control program recorded therein according to claim 16, wherein the presentation section is a printing device capable of printing information regarding the price difference on a receipt paper.

20. The computer-readable storage medium having the price information presentation control program recorded therein according to claim 16, wherein the presentation section is a display device capable of displaying information regarding the price difference.

* * * * *